United States Patent
Vesco et al.

(10) Patent No.: US 10,488,843 B2
(45) Date of Patent: Nov. 26, 2019

(54) METHOD AND SYSTEM FOR CHECKING POSITIONING ACCURACY OF A CNC MACHINE

(71) Applicant: FIDIA S.P.A., San Mauro Torinese (IT)

(72) Inventors: Mario Vesco, Baldissero Torinese (IT); Giuseppe Morfino, Pino Torinese (IT)

(73) Assignee: FIDIA S.P.A., San Mauro Torinese (IT)

(*) Notice: Subject to any disclaimer, the term of this patent is extended or adjusted under 35 U.S.C. 154(b) by 427 days.

(21) Appl. No.: 15/037,289

(22) PCT Filed: Feb. 25, 2015

(86) PCT No.: PCT/EP2015/053881
§ 371 (c)(1),
(2) Date: May 17, 2016

(87) PCT Pub. No.: WO2015/128343
PCT Pub. Date: Sep. 3, 2015

(65) Prior Publication Data
US 2016/0274565 A1    Sep. 22, 2016

(30) Foreign Application Priority Data
Feb. 27, 2014 (EP) ................................ 14156999

(51) Int. Cl.
*G05B 19/401* (2006.01)
*G01C 5/04* (2006.01)
*G01F 23/00* (2006.01)

(52) U.S. Cl.
CPC ............. *G05B 19/401* (2013.01); *G01C 5/04* (2013.01); *G01F 23/00* (2013.01);
(Continued)

(58) Field of Classification Search
CPC .......... G05B 19/40; G05B 2219/37506; G05B 2219/49195; G05B 2219/50046;
(Continued)

(56) References Cited

U.S. PATENT DOCUMENTS

| 4,434,561 A | 3/1984 | Gaspar |
| 5,105,368 A | 4/1992 | Alexandersen et al. |

(Continued)

FOREIGN PATENT DOCUMENTS

| JP | S5724522 U | 2/1982 |
| JP | H0712624 A | 1/1995 |

(Continued)

OTHER PUBLICATIONS

Schlesinger, G., "Testing Machine Tools," Seventh Edition, Second Impression, Jan. 1, 1970, The Machinery Publishing Co., Ltd., Brighton, England, 98 pages.
(Continued)

*Primary Examiner* — Dzung Tran
(74) *Attorney, Agent, or Firm* — McCoy Russell LLP

(57) ABSTRACT

A method for checking positioning accuracy of a CNC machine with a machine tool head and a machine table using an x, y, z coordinate system, the method comprising:
a) arranging a plurality of vessels on the table, the vessels in fluid connection with each other to form a system of vessels, the vessels filled with a liquid,
b) mounting a distance sensor to the tool head,
c) positioning the tool head to a position above the surface of the liquid in one of the vessels,
d) a determining the z coordinate for which the distance sensor touches the surface of the liquid,
or,
for a predetermined position of the tool head in z direction above the liquid, determining the distance between the distance sensor and the liquid;
(Continued)

steps c) and d) are repeated for each vessel to determine a z coordinate of the surface of the liquid.

7 Claims, 2 Drawing Sheets

(52) U.S. Cl.
 CPC ........... *G05B 2219/37506* (2013.01); *G05B 2219/49195* (2013.01); *G05B 2219/50046* (2013.01)

(58) Field of Classification Search
 CPC ......... G05B 19/401; G05C 5/04; G01F 23/00; G01B 21/042
 USPC .................................. 700/193, 245; 33/502
 See application file for complete search history.

(56) References Cited

U.S. PATENT DOCUMENTS

| | | | |
|---|---|---|---|
| 8,336,219 B2 | 12/2012 | Grzesiak et al. | |
| 2003/0069709 A1* | 4/2003 | Noda | G01B 21/042 702/104 |
| 2006/0266100 A1* | 11/2006 | McMurtry | G01B 3/30 73/1.79 |
| 2009/0248345 A1* | 10/2009 | Jonas | G01B 21/042 702/94 |
| 2013/0036619 A1* | 2/2013 | Ruck | G05B 19/401 33/503 |
| 2013/0203320 A1* | 8/2013 | Ghalambor | B24C 1/083 451/2 |
| 2013/0268226 A1* | 10/2013 | Morfino | G01R 35/00 702/94 |

FOREIGN PATENT DOCUMENTS

| | | |
|---|---|---|
| JP | 2010197230 A | 9/2010 |
| JP | 2010530532 A | 9/2010 |
| SU | 508674 A1 | 3/1976 |

OTHER PUBLICATIONS

Gayde, J. et al., "Combined Levelling Systems for the Vertical Monitoring of a Large Physics Experiment," 3rd IAG / 12th FIG Symposium, May 22, 2006, Baden, Germany, 14 pages.

SA European Patent Office, International Search Report Issued in Patent Application No. PCT/EP2015/053881, dated Jun. 3, 2015, WIPO, 3 pages.

European Patent Office, Extended European Search Report Issued in Application No. 14156999.6, dated May 30, 2014, 13 pages.

Japanese Patent Office, Office Action Issued in Application No. 2016516084, dated Jun. 6, 2017, 8 pages.

* cited by examiner

METHOD AND SYSTEM FOR CHECKING POSITIONING ACCURACY OF A CNC MACHINE

CROSS REFERENCE TO RELATED APPLICATIONS

The present application is a U.S. National Phase of International Patent Application Serial No. PCT/EP2015/053881, entitled "METHOD AND SYSTEM FOR CHECKING POSITIONING ACCURACY OF A CNC MACHINE," filed on Feb. 25, 2015, which claims priority to European Patent Application No. 14156999.6, entitled "METHOD AND SYSTEM FOR CHECKING POSITIONING ACCURACY OF A CNC MACHINE," filed on Feb. 27, 2014, the entire contents of each of which are hereby incorporated by reference for all purposes.

TECHNICAL FIELD

The invention is directed to a method and a system for checking positioning accuracy of a CNC machine, in particular, a gantry machine, with a machine tool head and a machine table. In a CNC (computer numerical control) machine, a part that is to be machined or processed is mounted onto a machine table of the CNC machine. A computer program controls a machine tool head regarding its movement to a specific location or along a specific path where machining or processing operations are performed.

BACKGROUND AND SUMMARY

Due to different error sources (e.g., manufacturing tolerance, misalignments, etc.), a machine tool head generally approaches or moves to a position that deviates from the theoretical (ideal) position according to the CNC program or control. In this way, displacement or positioning errors occur. The underlying errors are sometimes classified into static and dynamic positioning errors, wherein static positioning errors result from machine geometry, structure rigidity, etc., whereas dynamic errors are based on servo parameters, acceleration, etc. In order to correct or compensate for positioning or displacement errors, firstly, it is necessary to measure or determine these errors. The prior art provides different methods for measuring errors with laser trackers or interferometer telescoping ball bars.

Depending on the geometry and/or size of the CNC machine, however, these conventional methods are not always suitable. For example, in case of a large machine, at different positions, the reflector being mounted to the machine tool head will be too far from the laser source so that no reliable position determination may be made. In view of this, a need exists for an improved method and system for determining positioning accuracy of a CNC machine, in particular, for the case of large machines.

The invention thus provides a method for checking positioning accuracy of a CNC machine with a machine tool head and a machine table, using an x, y, z coordinate system, wherein the z coordinate is the coordinate perpendicular to a machine table surface, the method comprising the steps: (a) arranging a plurality of vessels on the machine table, wherein the vessels are in fluid connection with each other to form a system of communicating vessels, wherein the system of communicating vessels is filled with a liquid; (b) mounting a distance sensor to the machine tool head; (c) positioning the machine tool head to a position perpendicular above a surface of the liquid in one of the vessels; (d) approaching the surface of the liquid with the distance sensor and determining the z coordinate for which the distance sensor touches the surface of the liquid; or, for a predetermined z coordinate of the machine tool head, determining the distance between the distance sensor and the surface of the liquid; wherein steps (c) and (d) are repeated for each vessel to determine a respective z coordinate of the surface of the liquid; an apparatus for checking positioning accuracy of a CNC machine, the apparatus comprising a plurality of vessels in fluid connection to each other to form a system of communicating vessels, wherein the system of communicating vessels is filled with a liquid; and/or a system for checking positioning accuracy comprising: a CNC machine with a machine tool head and a machine table, an apparatus for checking positioning accuracy of a CNC machine, the apparatus comprising a plurality of vessels in fluid connection to each other to form a system of communicating vessels, wherein the system of communicating vessels is filled with a liquid, wherein the liquid is an electrolyte solution, and a vessel electrode is placed in contact with the electrolyte solution in each vessel, wherein a distance sensor is mounted to the machine tool head.

In particular, a method for determining a positioning error of a CNC machine is provided, the machine having a machine tool head and a machine table, using an x, y, z (Cartesian) coordinate system, wherein the z coordinate is the coordinate perpendicular to the machine table surface, the method comprising the steps of a) arranging a plurality of vessels on the machine table, wherein the vessels are in fluid connection with each other to form a system of communicating vessels, wherein the system of communicating vessels is filled with a liquid;

b) mounting a distance sensor to the machine tool head;

c) positioning the machine tool head to a position perpendicular above the surface of the liquid in one of the vessels;

d) approaching the surface of the liquid with the distance sensor and determining the z coordinate for which the distance sensor touches the surface of the liquid, or, for a predetermined z coordinate of the machine tool head, determining the distance between the distance sensor and the surface of the liquid;

wherein steps c) and d) are repeated for each vessel to determine a respective z coordinate of the surface of the liquid.

This method allows determining positioning or geometric accuracy in z direction for many different machine geometries and sizes. The machine tool head is moved to an x-y position corresponding to a position of one of the vessels. In this way, the sensor is positioned over the surface of the liquid in said vessel (at a height or z coordinate given by the CNC control), permitting a determination of the height or level of the liquid surface. This determination may be performed in a non-contact manner, e.g. by measuring the distance between the distance sensor or the machine tool head and the surface of the liquid. As an alternative, the liquid surface may be approached from above (i.e. along the z direction) until the sensor touches the liquid surface. As the arrangement of vessels forms a system of communicating vessels, the height or z coordinate of the surface of the liquid is the same throughout the vessels. Hence, the z coordinate determined by the CNC system, theoretically or ideally, should be the same for all vessels. As a consequence, any deviation or difference in the z coordinate from one vessel to another vessel allows for a determination of a positioning accuracy and, thus, a positioning error in z direction.

The "reference system" given by the communicating vessels having an equal level in all x-y positions permits to use the generally inaccurate CNC machine for measuring and determining its own and inherent errors. By repeating steps c) and d) for each vessel, a map of the z coordinates of the surface of the liquid at the different vessel positions may be obtained.

The CNC machine may be a gantry machine.

Different types of distance sensors are possible. For example, the distance sensor may be a non-contact distance sensor. In particular, it may be a laser distance sensor, a microwave distance sensor or a radar distance sensor. These sensors allow for a fast and accurate determination of the distance between the sensor and/or the machine tool head and the liquid surface, for example, via a time-of-flight measurement. For these cases, preferably, the liquid is reflective for the electromagnetic waves used. For example, when using a laser distance sensor, the liquid may be non-transparent for the laser light.

As an alternative, in step a), the liquid is an electrolyte solution and an electrode element, called vessel electrode, is placed in contact with the electrolyte solution in each vessel; in step b), the distance sensor comprises an electrode element, called tool head electrode, which is mounted to the machine tool head, wherein the material of the tool head electrode is different from the material of the vessel electrode; step c) comprises approaching the surface of the electrolyte solution in a vessel with the tool head electrode; and step d) comprises determining the z coordinate for which the tool head electrode touches the surface of the solution by or via determining an electrical potential difference between the tool head electrode and the respective vessel electrode.

In other words, the invention provides a method for determining a positioning error of a CNC machine, the machine having a machine tool head and a machine table, using an x, y, z (Cartesian) coordinate system, wherein the z coordinate is the coordinate perpendicular to the machine table surface, the method comprising the steps of a) arranging a plurality of vessels on the machine table, wherein the vessels are in fluid connection with each other to form a system of communicating vessels, wherein the system of communicating vessels is filled with an electrolyte solution, and wherein an electrode element, called vessel electrode, is placed in contact with the electrolyte solution in each vessel;

b) mounting an electrode element, called tool head electrode, to the machine tool head, wherein the material of the tool head electrode is different from the material of the vessel electrode;

c) approaching the surface of the electrolyte solution in a vessel with the tool head electrode;

d) determining the z coordinate for which the tool head electrode touches the solution surface by or via determining an electrical potential difference between the tool head electrode and the respective vessel electrode;

wherein steps c) and d) are repeated for each vessel to determine a respective z coordinate of the surface of the solution.

According to this alternative, the tool head electrode approaches the surface of the electrolyte solution within the open top vessel from above (i.e. along the z direction). Because of the use of different electrodes, i.e., electrodes of different materials, an electrical potential difference occurs as soon as the tool head electrode touches the surface of the electrolyte solution, similarly to the case of a galvanic cell. This enables the system to determine the z coordinate of the surface of the electrolyte solution to a high degree of accuracy.

The electrolyte solution may be a saline solution.

Each vessel electrode is positioned and/or arranged so that it is wetted by the electrolyte solution. For example, an electrode element, the vessel electrode, may be placed in each vessel. As an alternative, each vessel electrode may be embedded within a vessel wall (but in contact with the electrolyte solution) or may pierce the vessel wall from the outside of the vessel. As a further alternative, the vessel electrode may be formed as part of the vessel side wall or bottom wall, for example, as the base element of the vessel.

Steps c) and d) may comprise periodically and/or continuously determining the potential difference while approaching the surface of the solution until a predetermined potential difference threshold is exceeded. Such a regular and/or continuous check of the difference of the electrical potential enables a very precise determination of when the surface of the electrolyte solution is reached. Upon touching the surface of the solution with the vessel electrode, there will be a sudden increase in the electrical potential difference. By providing a predetermined threshold, noise during the measurement process may be reliably neglected.

In the methods described above, the approaching may be stopped as soon as, in step d), an increase in the potential difference, in particular above a predetermined potential difference threshold, is determined.

For the sake of simplicity, the "potential difference" may refer to the absolute value of the measured electrical potential difference, to avoid any complications because of the sign.

Such an immediate stopping reduces the time consumption and accelerates the overall method. The determination of the potential difference may involve a potential difference measurement device. The control of the CNC machine may periodically and/or continuously poll or sample the potential difference measurement device to determine whether an increase in the potential difference, particularly above a predetermined threshold, has occurred, followed by a stop signal to the machine tool head driving part. Alternatively, the potential difference measurement device may be configured to automatically send an indicator signal relating to the detected potential difference to the CNC machine. Such an indicator signal may be sent periodically or only if an increase in the potential difference, particularly above a predetermined threshold, is detected. The indicator signal may contain the value of the determined potential difference and/or (only) an indication that a predetermined threshold has been exceeded.

The approaching of the surface may be at a constant speed, in particular, as of a predetermined distance above the estimated level of the surface of the solution. For example, the speed may lie between about 2 mm/min to 20 mm/min.

The vessel electrode may be a metal electrode, e.g., made of aluminium. The tool head electrode may comprise a water-repellent material. At the side facing the surface of the solution, the tool head electrode may have a tip form; it may have a spherical and/or a conical shape. The tool head electrode may be a graphite electrode, a copper electrode or a silver electrode.

The use of a water-repellent or hydrophobic electrode, such as a graphite electrode, has the advantage that distortions or errors during the measurement (e.g., due to some capillary effect when approaching the surface of the solution and/or due to solution droplets adhering to the tool head electrode) are avoided or at least reduced.

Each vessel electrode and the tool head electrode may be electrically connected to a potential difference measurement device, for example, a voltmeter. Alternatively, each vessel electrode may be electrically connected to the machine table electrical ground.

Steps c) and d) of the above-described methods may be performed in an automated way, in particular, via a corresponding program of the CNC machine. For example, the x-y positions of the vessels as well as an estimated height or level of the surface of the liquid, particularly the electrolyte solution, and the movement path between the vessels may be programmed into the CNC machine. This allows for an efficient execution of the described methods for checking the positioning accuracy.

Step a) of the above-described methods may comprise:
mounting a light emitter to the machine tool head;
programming the x-y coordinates of the locations where to place the vessels into the CNC machine;
approaching each x-y coordinate with the machine tool head;
mounting a vessel at the location on the machine table identified by a light spot from the light emitter.

In this way, the locations where to mount the vessels are identified in a simple manner. Furthermore, the x-y coordinates for the vessel positions have to be programmed only once and, then, may be used both for mounting the vessels and for the subsequent step of positioning the machine tool head over the liquid surface in one of the vessels and/or approaching the surface of the electrolyte solution in the vessels, thus, leading to a highly efficient procedure. The light emitter may be a laser emitter.

In general, an arbitrary number of vessels may be used. Already two vessels allow determining a deviation or difference in the z coordinate between the locations of these tool vessels. Particularly when using more than two vessels, the vessels may be arranged in form of a one-dimensional or two-dimensional array. In particular, the vessels may be positioned on the lattice points of a lattice; for example, a rectangular or square lattice may be used.

In principle, the vessels may be fluidly connected in an arbitrary manner to form the system of communicating vessels. For example, a vessel may connect to each next neighbor. If the vessels are arranged on lattice points, each vessel may be fluidly connected to the vessels on neighboring lattice points. The fluid connection may achieved via tubes. The tubes may be flexible hoses or rigid pipes.

The described methods may further comprise the step of compensating a positioning error in z direction.

Such a compensation may be obtained in different ways. For example, the compensation may involve a mechanical rearrangement or realignment of the machine. Alternatively or additionally, a software compensation may be implemented in the control of the CNC machine. Different algorithms for software compensation are known. For example, a linear compensation resulting from a linear interpolation of the error or deviation values at neighboring vessel positions may be employed.

The invention further provides an apparatus for checking positioning accuracy of a CNC machine, the apparatus comprising a plurality of vessels in fluid connection to each other to form a system of communicating vessels, wherein the system of communicating vessels is filled with a liquid. The liquid may be an electrolyte solution, and an electrode element, called a vessel electrode, may be placed in contact with the electrolyte solution in each vessel.

This apparatus enables the performance of the above described methods.

The features mentioned above in connection with the method may also be provided in the context of the apparatus. For example, each vessel electrode may be placed within the vessel or may be part of the vessel; it may be a metal electrode and/or the vessels may be arranged in the form of an array.

The apparatus may comprise a support on which the vessels are mounted. With such a support, mounting and unmounting the apparatus, particularly the vessel arrangement, to a CNC machine is simplified and accelerated.

The invention also provides a system for checking positioning accuracy comprising:
a CNC machine with a machine tool head and a machine table;
an apparatus for checking positioning accuracy as described above;
wherein a distance sensor is mounted to the machine tool head.

The CNC Machine May be a Gantry Machine.

The system may further be configured to perform the above-described methods. In particular, the distance sensor comprises an electrode element, called tool head electrode, which is mounted to the machine tool head, wherein the material of the tool head electrode is different from the material of the vessel electrode, and the system may further comprise a potential difference measurement device configured to measure an electrical potential difference between a vessel electrode and the tool head electrode. The tool head electrode may be a graphite electrode.

In the system, the CNC machine may be programmed to position the machine tool head to a position perpendicular above the surface of the liquid in one of the vessels, and to determine the z coordinate for which the distance sensor touches the surface of the liquid, or, for a predetermined z coordinate of the machine tool head, to determine the distance between the distance sensor and the surface of the liquid, wherein the positioning and determining steps a repeated for each vessel to determine a respective z coordinate of the surface of the liquid.

In case of a using electrode elements, the CNC machine may be programmed to approach the surface of the electrolyte solution in a vessel with the tool head electrode and to determine the z coordinate for which the tool head electrode touches the surface of the solution by determining a potential difference between the tool head electrode and the respective vessel electrode,
wherein the approaching and determining steps are repeated for each vessel to determine a respective z coordinate of the surface of the solution.

Using the difference in the electric potential, the system allows for a fast and reliable check of the positioning accuracy of the CNC machine.

The CNC may also be programmed to compensate a positioning error in z direction.

Further aspects will be described in the following with reference to the accompanying figures.

DETAILED DESCRIPTION

Figure 1:
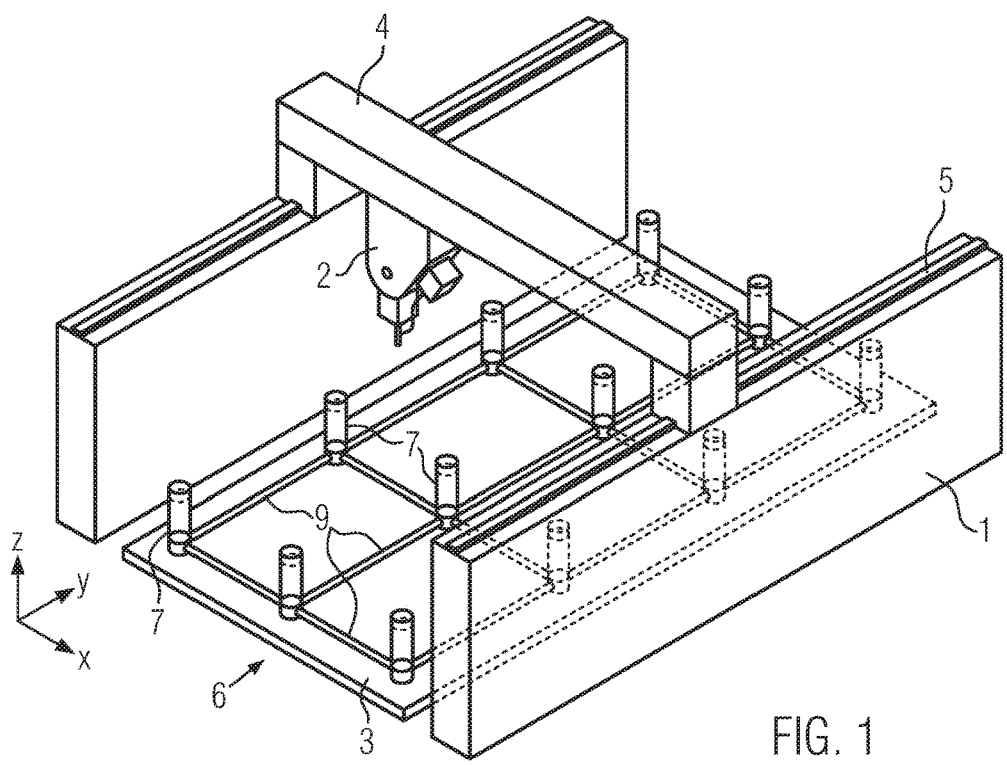
FIG. 1 shows a schematic illustration of a system for checking positioning accuracy in case of a gantry machine, FIG. 2 schematically illustrates a part of an apparatus for checking positioning accuracy, FIG. 3 schematically illustrates an apparatus for checking positioning accuracy.

FIG. 1 is a schematic view of a gantry machine 1 having a machine tool head 2 and a machine table 3. A mobile cross beam 4 rests on a rail 5 on each side, these rails, theoretically or ideally, being arranged in parallel. During the construction phase of the gantry machine, all mechanical parts are accurately aligned and leveled.

The system is generally described using a Cartesian coordinate system, wherein the x and y coordinates span a plane parallel to the machine table 3, whereas the z coordinate is perpendicular thereto. In this example, the cross beam 4 moves in y direction, whereas the tool head 2 moves in x direction along the cross beam 4. When the machine tool head 2 is in a position with a specific z coordinate, its height above the machine table 3 should always be the same, irrespective of the x-y position.

However, due to different error sources such as a misalignment or asymmetry of load-bearing structural parts, the actual height of the machine tool head 2 above the machine table 3 varies for different x-y positions.

In order to determine the deviations or (static) errors, an apparatus 6 for checking the positioning accuracy is provided on the machine table 3.

The apparatus 6 comprises a plurality of vessels 7 that are arranged on the machine table 3. In the illustrated embodiment, the vessels 7 are arranged in the form of a two-dimensional array, more particularly on the lattice points of a rectangular lattice.

Each open top vessel has a cylindrical shape. For example, vessels may have a height of 15 centimeters and an inner diameter of 1 centimeter. The cylinder wall may be made of a transparent resin or glass. Of course, other geometries, dimensions, and materials are possible as well.

Figure 2:
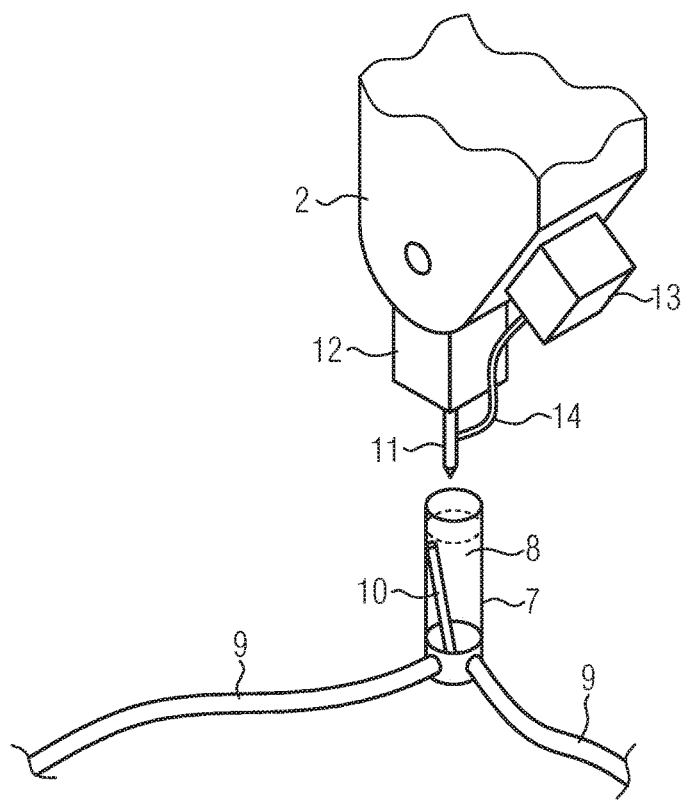

As illustrated in more detail in FIG. 2, each vessel is filled with an electrolyte solution 8. As an example, a saline solution with a NaCl concentration of between 5% and 30% may be used. Each vessel 7 is in fluid connection with its next neighbors (along the lattice axes) so as to form a system of communicating vessels. In other words, the liquid level of the electrolyte solution in each vessel has the same height; if electrolyte solution is added to one vessel, the level will rise in all vessels.

The fluid connection is achieved via tubes 9. These tubes 9 may be flexible hoses or rigid pipes.

Within each vessel 7, an electrode 10 is immersed in the electrolyte solution 8. These immersed electrodes 10 may be called vessel electrodes. At the machine tool head 2, an electrode 11 is mounted. It may be mounted as a tool to the spindle 12 of the machine tool head 2. The electrode that is mounted to the machine tool head may be called tool head electrode.

The vessel electrode 10 and the tool head electrode 11 are made of different materials. As an example, the vessel electrode 10 may be made of aluminium, and the tool head electrode 11 may be made of graphite. Other materials are possible as well. For example, both the vessel electrode 10 and the tool head electrode 11 may be made of metal; however, of different metals.

The tool head electrode 11 is tapered towards the electrolyte solution. As an example, at the side facing the vessels or the machine table (i.e. the side opposing the tool head or the spindle), the tool head electrode 11 may have a conical shape with a tip. To avoid droplets of the electrolyte solution adhering to the tool head electrode 11 and/or to avoid any capillary effects when approaching the surface of the electrolyte solution, the tool head electrode may comprise a hydrophobic or water-repellent material, at least at the tip portion. In case of a graphite electrode, the electrode material as such is already hydrophobic. When using a metal electrode, at least the tip portion may be treated so as to achieve a desired water repellency.

The tool head electrode 11 is electrically connected to an electrical potential difference measurement device 13 (e.g. a volt meter) via a cable 14. The vessel electrodes are also connected to the electrical potential difference measurement device via cables. For example, these cables may be arranged within the tubes 9, for example, so that vessel electrodes in neighboring vessels are electrically connected to each other. At some point, via a cable, an electrical contact is made to the outside of the vessel system towards the voltmeter. In this way, a potential difference between the vessel electrodes 10 and the tool head electrode 11 may be measured.

As an alternative to placing a vessel electrode into each vessel, part of the vessel itself may be formed as vessel electrode. For example, the base of the vessel may be made of aluminum onto which a (cylindrical) side wall made of glass or resin is mounted. In this case, the vessel base functions as vessel electrode and can be electrically contacted from the outside with a cable to provide an electrical connection to the electrical potential difference measurement device. If the vessel base constitutes the vessel electrode, the vessels may be fixed to the machine table in a way ensuring an electrical contact to the machine table electrical ground. In this case, wirings from the vessel electrodes to the electrical potential difference measurement device can be avoided.

As a further alternative, the vessel electrode may be embedded within the vessel wall or may pierce the vessel wall from the outside in a liquid tight manner.

It is to be understood that the above-described arrangement and process is not restricted to a use for a gantry machine, it may be employed with other CNC machine as well.

Figure 3:
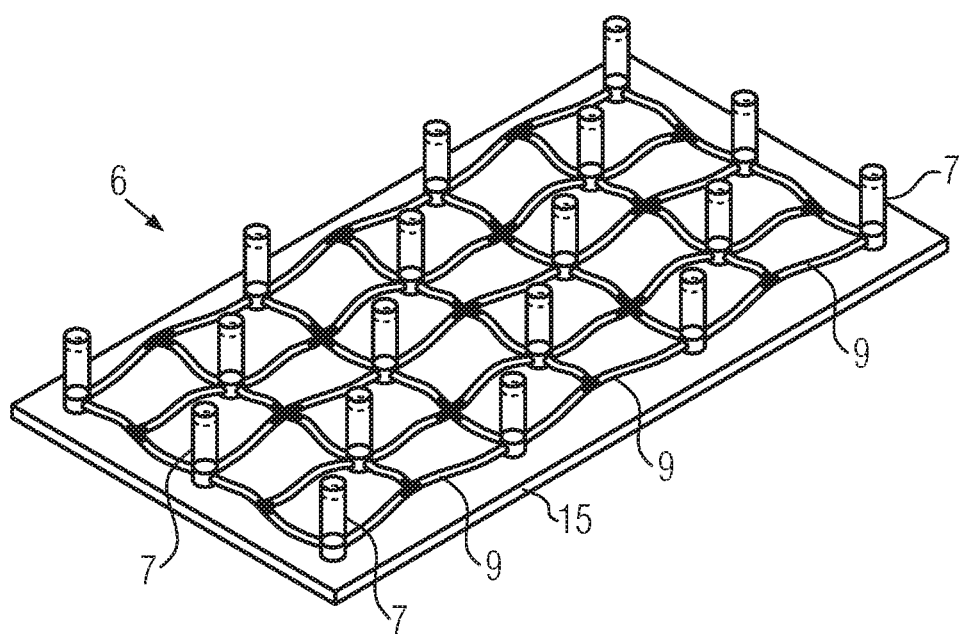

FIG. 3 schematically illustrates another apparatus for checking positioning accuracy. In this embodiment, the vessels 7 are fixedly mounted on a support 15. In this manner, the apparatus 6 may be easily arranged on a machine table as well as removed after execution of a measurement process.

In the example illustrated in FIG. 3, the vessels 7 are arranged on the lattice points of a lattice. Of course, other arrangements of the vessels are possible as well. The number of vessels used as well as their distance from each other may vary depending on the desired accuracy of the measurement process. As an example, the vessels may be spaced apart by a distance of about 10 centimeters to 50 centimeters.

Particularly when the vessels are to be mounted directly onto the machine table (but also when they are mounted onto a separate support), their desired or intended positions in x-y coordinates may be programmed into the control of the CNC machine. Then, some light emitter, such as a laser pointer, is mounted to the machine tool head in such a way that the light beam is directed towards the machine table, i.e., parallel to the z axis. An operator instructs the CNC machine to move the tool head to the first vessel position.

When this position is reached, the machine tool head is halted, and the light spot of the light emitter on the machine table indicates the position where to mount the first vessel. After having manually arranged and fixed the vessel at the indicated position, the operator instructs the CNC machine to move the machine tool head to the next position, where the second vessel is mounted at the location of the light beam spot. This procedure is repeated until all vessels have been arranged on the machine table.

The vessels are fluidly connected to each other to form a system of communicating vessels and are filled with the electrolyte solution. In principle, the level of the electrolyte solution in the vessels may be chosen arbitrarily. As an example, the level may be at 3 mm to 10 mm below the upper edge (i.e. the open end) of the vessel.

The CNC machine is further programmed to approach each vessel's x-y position by a movement in the x-y plane, followed by approaching the surface of the electrolyte solution via a movement in z direction through the upper opening. The movement in z direction is controlled such that it stops when the tool head electrode 11 reaches or touches the electrolyte solution. This is the case when the potential difference measurement device 13 measures an electrical potential difference. As soon as the tool head electrode touches the surface of the electrolyte solution, a voltage or potential difference between the two electrodes is generated, similarly to the case of a galvanic cell.

When approaching the surface of the electrolyte solution, the machine tool head, firstly, may move at a high speed (e.g., 20 mm/min) until the tip of the tool head electrode is at the level of the opening of the vessel. Then, the speed in z direction is reduced, e.g., to 3 mm/s. The potential difference measurement device 13 continuously monitors or measures the potential difference. If the potential difference exceeds a predetermined threshold, for example, of 0.1 V, the device 13 stores an indicator value in its memory. For example, the indicator parameter may take the value of 1. If no potential difference is detected (or if the potential difference is below the predetermined threshold), the indicator parameter is set to 0.

The control of the CNC machine periodically reads the indicator values. If the parameter takes the value of 1, the control stops the movement of the machine tool head and records the z coordinate of this position.

According to an alternative implementation, the potential difference measurement device 13 itself is configured to generate an indicator signal (indicating that the measured potential difference exceeds a predetermined threshold), which is sent to the control of the CNC machine, thus triggering that the machine tool head is stopped. In this latter case, where the CNC machine does not periodically sample the device 13, the approaching speed of the machine tool head may be increased, e.g., to up to 20 mm/s.

As another alternative, the indicator value may be periodically sent from the device 13 to the control of the CNC machine, e.g., every 2 ms. After the z coordinate corresponding to the level of the electrolyte solution in the first vessel has been determined, the machine tool head is retracted in z direction and, then, moved to the x-y position of the next vessel. There, the same process of approaching the surface of the electrolyte solution is repeated. After having determined the z coordinate corresponding to the surface of the electrolyte solution in all vessels, a deviation map is obtained for the plurality of x-y positions.

This deviation map may then be used to correct the system, via a mechanical realignment of the structural path of the CNC machine and/or via a compensation in the CNC software.

As an example of a software compensation, one of the vessel position may be taken as a reference point. With respect to this reference point, control of the z direction is corrected or compensated so that, for the CNC control, the surface of the electrolyte solution will be at the same z coordinate for all x-y positions of the vessels. For positions between the vessels, a linear interpolation may be used.

Instead of determining the level or height of the liquid in the vessels via the above-described electrical potential or voltage measurement, it is also possible use a non-contact distance sensor. In this case, the liquid need not be an electrolyte solution but can be any liquid such as water; furthermore, no electrodes have to be place in the vessels. The non-contact distance sensor may be a laser distance sensor, a microwave distance sensor or a radar distance sensor. The distance sensor is mounted to the machine tool head which is moved to each vessel's x-y position by a movement in the x-y plane at a predetermined (constant) height or z coordinate. Over each vessel, the distance from the sensor and/or the machine tool head to the surface of the liquid is measured, from which the z coordinate of the surface of the liquid may be determined. In this way, again, a map of the surface levels is obtained for the plurality of x-y positions.

Depending on the ambient conditions and/or the time period during which the positioning accuracy is checked, one may take account of evaporation of the liquid in the vessels. This can be achieved by corresponding measurements (e.g. using an atmometer) and/or a computer simulation (e.g. a molecular dynamics simulation). Then, evaporation effects in the measured z coordinates of the surface of the liquid may be compensated for, e.g. via a corresponding computer program.

The invention claimed is:

1. A method for checking positioning accuracy of a CNC machine with a machine tool head and a machine table, using an x, y, z coordinate system, wherein the z coordinate is a coordinate perpendicular to a machine table surface, the method comprising the steps:
    a) arranging a plurality of vessels on the machine table, wherein the vessels are in fluid connection with each other to form a system of communicating vessels, wherein the system of communicating vessels is filled with an electrolyte solution, and wherein a vessel electrode is placed in contact with the electrolyte solution in each vessel,
    b) mounting a tool head electrode to the machine tool head, wherein a material of the tool head electrode is different from a material of the vessel electrode,
    c) positioning the machine tool head to a position perpendicular above a surface of the electrolyte solution in one of the vessels,
    d) approaching the surface of the electrolyte solution with the tool head electrode and determining the z coordinate for which the tool head electrode touches the surface of the electrolyte solution by determining an electrical potential difference between the tool head electrode and the respective vessel electrode,
    wherein steps c) and d) are repeated for each vessel to determine a respective z coordinate of the surface of the electrolyte solution.

2. The method according to claim 1, wherein steps c) and d) comprise periodically and/or continuously determining the electrical potential difference while approaching the surface of the electrolyte solution until a predetermined voltage amount is exceeded.

3. The method according to claim 2, wherein the approaching is stopped as soon as an increase in the electrical potential difference above the predetermined voltage amount is determined.

4. The method according to claim 1, wherein the vessel electrode is a metal electrode and/or the tool head electrode is a graphite electrode.

5. The method according to claim 1, wherein steps c) and d) are performed in an automated way via a program of the CNC machine.

6. The method according to claim 1, wherein the vessels are arranged in an array.

7. The method according to claim 1, the method further comprising a step of compensating a positioning error in a z direction.

* * * * *